(12) United States Patent
Zhang et al.

(10) Patent No.: US 11,181,290 B2
(45) Date of Patent: Nov. 23, 2021

(54) ALARM PROCESSING DEVICES, METHODS, AND SYSTEMS

(71) Applicant: HONEYWELL INTERNATIONAL INC., Morris Plains, NJ (US)

(72) Inventors: Weilin Zhang, Morris Plains, NJ (US); Peng Jiang, Morris Plains, NJ (US); Zhenjun Mei, Morris Plains, NJ (US); Dapeng Li, Morris Plains, NJ (US); Yaohui Hu, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 68 days.

(21) Appl. No.: 16/619,223

(22) PCT Filed: Jun. 5, 2017

(86) PCT No.: PCT/CN2017/087141
§ 371 (c)(1),
(2) Date: Dec. 4, 2019

(87) PCT Pub. No.: WO2018/223254
PCT Pub. Date: Dec. 13, 2018

(65) Prior Publication Data
US 2020/0166232 A1    May 28, 2020

(51) Int. Cl.
*F24F 11/38* (2018.01)
*G06F 16/901* (2019.01)
(Continued)

(52) U.S. Cl.
CPC ............ *F24F 11/38* (2018.01); *G06F 16/901* (2019.01); *G06F 16/9035* (2019.01); *G08B 25/001* (2013.01); *G08B 25/008* (2013.01)

(58) Field of Classification Search
CPC ......... F24F 11/38; F24F 11/32; G06F 16/901; G06F 16/9035; G08B 25/001; G08B 25/008; G05B 23/0267
See application file for complete search history.

(56) References Cited

U.S. PATENT DOCUMENTS

| 9,640,061 B1 * | 5/2017 | Klimanis ............. G08B 25/007 |
| 2002/0022894 A1 * | 2/2002 | Eryurek ................ G03F 7/0007 700/80 |

(Continued)

FOREIGN PATENT DOCUMENTS

| CN | 101494553 A | 7/2009 |
| CN | 104348667 A | 2/2015 |
| CN | 106713017 A | 5/2017 |

OTHER PUBLICATIONS

International Search Report of the International Searching Authority for PCT/CN2017/087141 with dated Feb. 26, 2018.

*Primary Examiner* — Ojiako K Nwugo
(74) *Attorney, Agent, or Firm* — Seager, Tufte & Wickhem, LLP (57) ABSTRACT

Devices, methods, and systems for alarm processing are described herein. One computing device for alarm processing, includes a memory and a processor configured to execute executable instructions stored in the memory to generate a first alarm for a first system based on a monitored value for the first system, receive a second alarm generated by a second system based on a monitored value for the second system, send the first alarm and the second alarm to an alarm queue, filter the alarm queue based on the monitored values associated with the first alarm and the second alarm within the alarm queue, and push the first alarm or the second alarm within the alarm queue to an application based on the filtering.

17 Claims, 4 Drawing Sheets

(51) Int. Cl.
   *G06F 16/9035* (2019.01)
   *G08B 25/00* (2006.01)

(56) References Cited

U.S. PATENT DOCUMENTS

| | | | |
|---|---|---|---|
| 2009/0204368 A1* | 8/2009 | Bickel | G01D 4/002 |
| | | | 702/179 |
| 2011/0119279 A1* | 5/2011 | Wacker | G01D 1/00 |
| | | | 707/754 |
| 2012/0310381 A1* | 12/2012 | Karaffa | G05B 19/418 |
| | | | 700/80 |
| 2015/0137968 A1* | 5/2015 | Rusin | G08B 25/001 |
| | | | 340/506 |
| 2015/0379864 A1* | 12/2015 | Janchookiat | G06F 11/3419 |
| | | | 340/511 |
| 2016/0041537 A1* | 2/2016 | Landou | G05B 15/02 |
| | | | 700/275 |
| 2017/0046057 A1* | 2/2017 | Snuggerud | G05B 15/02 |
| 2017/0116847 A1* | 4/2017 | Ferro | G08B 29/185 |
| 2017/0186307 A1* | 6/2017 | Kim | G08B 25/008 |
| 2017/0205100 A1* | 7/2017 | Sanghamitra | H04L 12/2803 |
| 2017/0321923 A1* | 11/2017 | Wiens-Kind | G05B 19/042 |
| 2018/0324122 A1* | 11/2018 | Schwartz | G06F 9/54 |
| 2020/0166232 A1* | 5/2020 | Zhang | F24F 11/38 |
| 2020/0380846 A1* | 12/2020 | Zhang | G08B 19/00 |

\* cited by examiner

Fig. 4
ALARM PROCESSING DEVICES, METHODS, AND SYSTEMS

The present application claims priority to Chinese Patent Application No. PCT/CN2017/087141, filed on Jun. 5, 2017, entitled "ALARM PROCESSING DEVICES, METHODS, AND SYSTEMS", which is incorporated herein by reference.

TECHNICAL FIELD

The present disclosure relates to devices, methods, and systems for alarm processing.

BACKGROUND

Systems can utilize monitors to monitor a plurality of values for the system. For example, heating, ventilation, and air conditioning (HVAC) systems can include a plurality of monitors to monitor the state of a plurality of devices of the system. For example, the plurality of monitors can monitor the performance of the plurality of devices. In some examples, the system can utilize the performance data of the plurality of devices to determine when one or more of the plurality of devices is not performing to a manufacturer specification. For example, the monitored performance can be utilized to determine when a device fails or is likely to fail.

The system can include pre-configured alarm formats. In some examples, the system can utilize additional sensors and/or alarm generators that can utilize different pre-configured alarm formats. In these examples, it can be difficult to provide consistent alarm formats to end users or to other applications. In addition, the system and additional sensors and/or alarm generators can generate duplicate alarms that can be confusing to an end user or application.

DETAILED DESCRIPTION

Alarm processing devices, methods, and systems are described herein. For example, one or more embodiments include a computing device for alarm processing, a memory and a processor configured to execute executable instructions stored in the memory to generate a first alarm for a first system based on a monitored value for the first system, receive a second alarm generated by a second system based on a monitored value for the second system, send the first alarm and the second alarm to an alarm queue, filter the alarm queue based on the monitored values associated with the first alarm and the second alarm within the alarm queue, and push the first alarm or the second alarm within the alarm queue to an application based on the filtering.

Previous systems can utilize pre-configured alarm notifications to alert a device or user when a device of the system is malfunctioning. For example, a system can generate an alarm when a device is overheating, and transmit a notification to a user when the alarm is generated. The previous systems can be pre-configured with instructions for generating an alarm and instructions for a particular type or format of alarm to be generated. For example, a system can include pre-configured alarm set points or threshold values that can be utilized to generate an alarm when a value for the system meets or exceeds an alarm set point. As used herein, an alarm set point or threshold value can be a value for the system that is outside a manufacturer recommended value.

In some examples, it can be difficult to reconfigure or change the pre-configured instructions of the system to alter the alarm set points or alarm formats for the system. For example, an administrator for the system may not have access to change the pre-configured instruction and thus there may not be a way to alter the set points or alarm formats for the system without altering the pre-configured instructions, which may not be accessible for the administrator or other end user of the system.

In some examples, a system can utilize multiple monitoring systems to generate the alarms and/or notifications. In these examples, the multiple monitoring systems can generate different types of alarms (e.g., different types of alarms, different alarm types, etc.) and in some cases can generate duplicate alarms (e.g., alarms generated based on the same system value or system change of value (COV), etc.).

The alarm processing devices, methods, and systems described herein can be utilized to provide uniform alarms without duplicate alarms to an application or user even when there are multiple monitoring systems. For example, a heating ventilation and air conditioning (HVAC) system can include a first monitoring system that can generate a first type of alarm based on values of the HVAC system and a second monitoring system can generate a second type of alarm based on values of the HVAC system. In this example, the alarm processing devices, methods, and systems described herein can normalize the first type of alarm and the second type of alarm to provide a consistent type of alarm for an application or user. In some examples, normalizing the types of alarms can include removing duplicate alarms. As such, an administrator or other user can utilize a plurality of different monitoring systems and receive uniform types of alarms for all alarms generated by the plurality of monitoring systems.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. As used herein, "a" or "a number of" something can refer to one or more such things. For example, "a number of users" can refer to one or more users.

Figure 1:
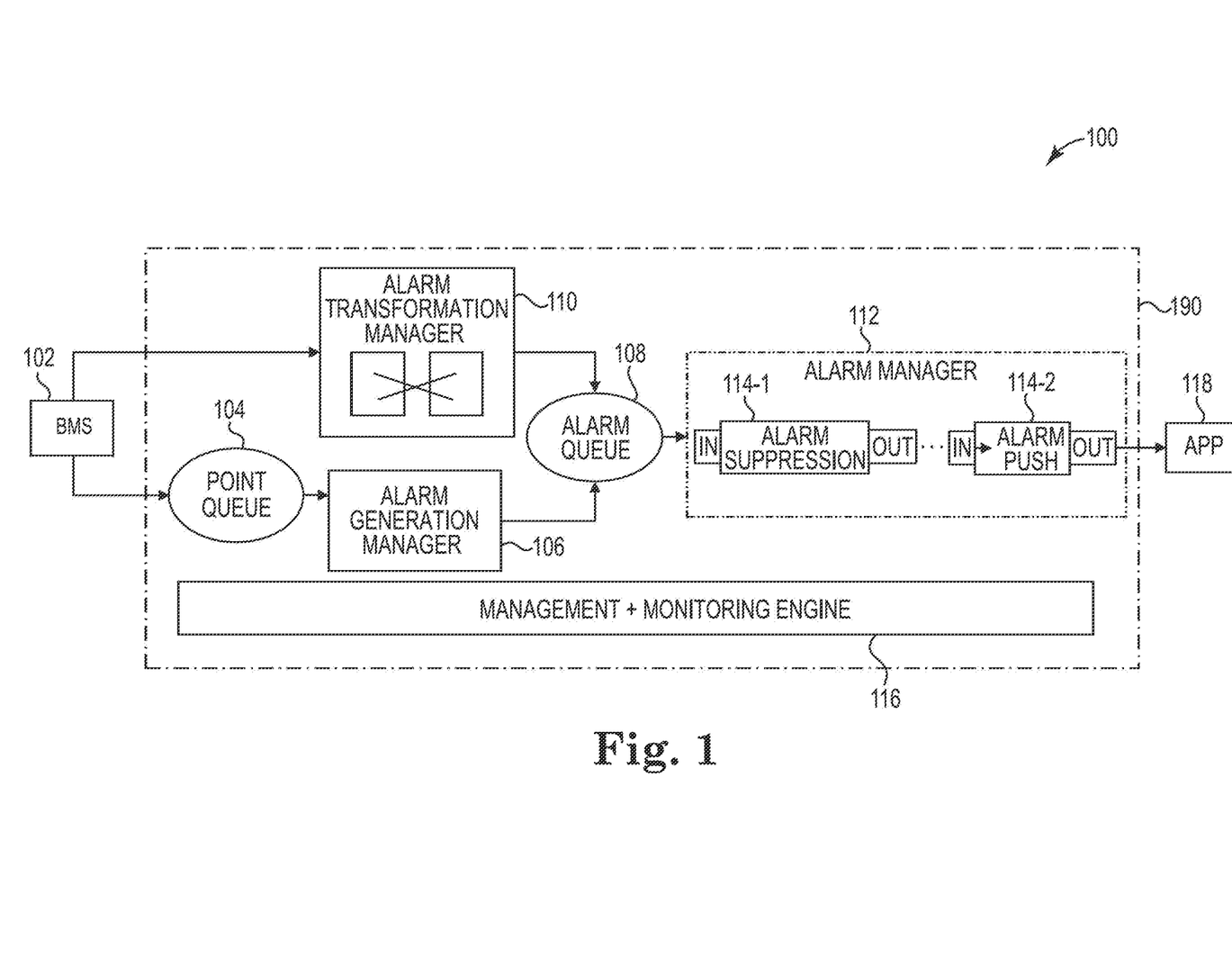
FIG. 1 is an example of a system for alarm processing according to one or more embodiments of the present disclosure.

FIG. 1 is an example of a system 100 for alarm processing according to one or more embodiments of the present disclosure. In some examples, the system 100 can include a computing device 190 that is communicatively coupled to a building management system (BMS) 102 and/or an application 118. As used herein, communicatively coupled can include a communication link (e.g., wireless communication link, etc.) that allows the computing device 190 to send and/or receive information (e.g., data packets, etc.) from the BMS 102 and/or application 118.

In some examples, the BMS 102 can be a building management system that includes a plurality of monitoring systems. For example, the BMS 102 can be a building management system for a HVAC system. In this example, the BMS 102 can utilize a plurality of monitoring systems to monitor values and/or COVs for the HVAC system. In some examples, a first monitoring system of the plurality of monitoring systems can generate a first type of alarm and a second monitoring system of the plurality of monitoring systems can generate a second type of alarm.

The BMS 102 can utilize a plurality of sensors to determine a plurality of values (e.g., state values, change of value (COV), etc.) for a particular system. For example, the BMS 102 can include temperature sensors, air flow sensors, and/or other types of sensors that can monitor values of an HVAC system. In some examples, the plurality of sensors (e.g., the values monitored by the sensors) can generate different types of alarms. For example, a first sensor can generate a first type of alarm and a second sensor can generate a second type of alarm based on the values monitored by the respective sensors.

In some examples, the plurality of values can be sent to a point queue 104 of the computing device 190. In some examples, the point queue 104 can store values that exceed an alarm threshold. As used herein, an alarm set point or alarm threshold can be a value for the system that is outside a manufacturer recommended value. In some examples, the values of the point queue 104 can be transmitted to an alarm generation manager 106 of the computing device. In some examples, the alarm generation manager 106 can be utilized to generate a first type of alarm for a system. For example, the alarm generation manager 106 can generate alarms for an HVAC system in the first type of alarm and/or a first alarm format. As used herein, a type of alarm can include a particular number of values organized in a particular format. In some examples, alarms generated by the BMS 102 can be transmitted to the alarm transformation manager 110 of the computing device 190. In some examples, a plurality of different types of alarms can be transmitted by the BMS 102 to the alarm transformation manager 110. For example, a second type of alarm and a third type of alarm can be transmitted to the alarm transformation manager 110. In this example, the second type of alarm and the third type of alarm can be different than the first type of alarm generated by the alarm generation manager 106.

The alarm transformation manager 110 can receive the plurality of types of alarms and normalize the plurality of types of alarms. As used herein normalizing the plurality of types of alarms can include transforming the different types of alarms into a particular type of alarm. For example, the alarm transformation manager 110 can receive an alarm from the BMS 102 that is in a particular type of alarm. In this example, the alarm transformation manager 110 can normalize the alarm from the particular type of alarm to a type of alarm that is generated by the alarm generation manager 106.

In some examples, the alarms generated by the alarm generation manager 106 of a particular type of alarm can be transmitted to an alarm queue 108 of the computing device 190. In addition, the alarms normalized by the alarm transformation manager 110 into the particular type of alarm can be transmitted to the alarm queue 108. In these examples, the alarm queue 108 can include a plurality of alarms that are normalized into the same type of alarm (e.g., type of alarm generated by the alarm generation manager 106, designated type of alarm for an application 118, etc.). In some examples, the system 100 can store a first type of alarm in the alarm queue 108 and push a different type of alarm corresponding to the first type of alarm to the application. For example, the alarms stored in the alarm queue 108 can be stored to be utilized for reviewing the original alarm generated prior to being sent to the alarm manager 112.

The plurality of alarms in the alarm queue 108 can be transmitted to an alarm manger 112 of the computing device 190. In some examples, the alarm manager 112 can include a plurality of alarm engines 114-1, 114-2. In some examples, the plurality of alarm engines 114-1, 114-2 can include an input and an output for processing the plurality of alarms in the alarm queue 108. In some examples, an output from one of the plurality of alarm engines 114-1, 114-2 can be received as an input for another engine from the plurality of engines 114-1, 114-2. For example, an alarm suppression engine 114-1 can receive an input from the alarm queue 118, perform a suppression process as described further herein, and provide an output. In this example, the output from the alarm suppression engine 114-1 can be received as an input by the alarm push engine 114-2, perform a push process as described further herein, and provide an output to an application 118.

In some examples, the alarm manager 112 can include a plurality of additional engines to perform the functions of the suppression engine 114-1 and the alarm push engine 114-2. For example, the alarm suppression engine 114-1 can include a comparison engine and/or a filtering engine.

The alarm suppression engine 114-1 can receive the plurality of alarms from the alarm queue 108 and compare the received plurality of alarms. For example, the suppression engine 114-1 can compare values for the plurality of alarms from the alarm queue 108. In some examples, the comparison of the values can be utilized to identify duplicate alarms. As used herein, duplicate alarms can be alarms generated for the same root cause and/or generated based on the same system values. As used herein, a root cause can include a device or sub-system that is malfunctioning or generating monitored values outside a threshold value.

The suppression engine 114-1 can determine a root cause of the plurality of alarms. In some examples, the suppression engine 114-1 can utilize values within the plurality of alarms to determine the root cause of each of the plurality of alarms. For example, the suppression engine 114-1 can determine that a root cause of an alarm is a low coolant level for an HVAC system based on a coolant level value associated with the alarm.

The suppression engine 114-1 can compare the root cause of a first alarm to the root cause of a second alarm. In some examples, the plurality of sensors associated with the BMS 102 can generate duplicate alarms for the same root cause. In these examples, the suppression engine 114-1 can compare the root cause to identify duplicate alarms and remove or suppress the duplicate alarms before the duplicate alarms are pushed to the application 118. For example, two sensors can each be monitoring a particular sub-system. In this example, the two sensors can each generate an alarm and/or provide values to the point queue 104 for alarm generation. In this example, the alarms will be duplicate alarms since they have the same root cause (e.g., the particular sub-system). In this example, the suppression engine 114-1 can remove or suppress one of the two alarms and send the other alarm to the alarm push engine 114-2.

The alarm push engine 114-2 can be utilized to send or transmit alarms received from the alarm suppression engine 114-1. As used herein, pushing an alarm to the application 118 can include transmitting or sending an alarm or notification to a user or application 118 being used by the user.

In some examples, the system 100 (e.g., computing device 190) can include management and monitoring engine 116. The management and monitoring engine 116 can monitor the system 100 and/or elements of the computing device 190. For example, the management and monitoring engine 116 can be utilized to monitor and confirm functionality of the alarm managers 112. In some examples, the management and monitoring engine 116 can receive feedback (e.g., indication of duplicate alarms received by the application 118, indication of alarms of different types being received by the application 118, etc.) from the application 118. For example, the application 118 can send feedback to the management and monitoring engine 116 to confirm that the application 118 is receiving alarms from the alarm push engine 114-2.

As described herein, the alarm manager 112 can be utilized to remove duplicate alarms from the alarm queue 108 prior to the alarms being pushed or transmitted to the application 118. As such, the system 100 can process a plurality of different types of alarms that are generated by a plurality of different sensors and/or alarm generators without transmitting duplicate alarms to the application 118. In addition, the system can process a plurality of different types of alarms that are generated by a plurality of different sensors and/or alarm generators and normalize the plurality of different types of alarms to a single type of alarm.

Figure 2:
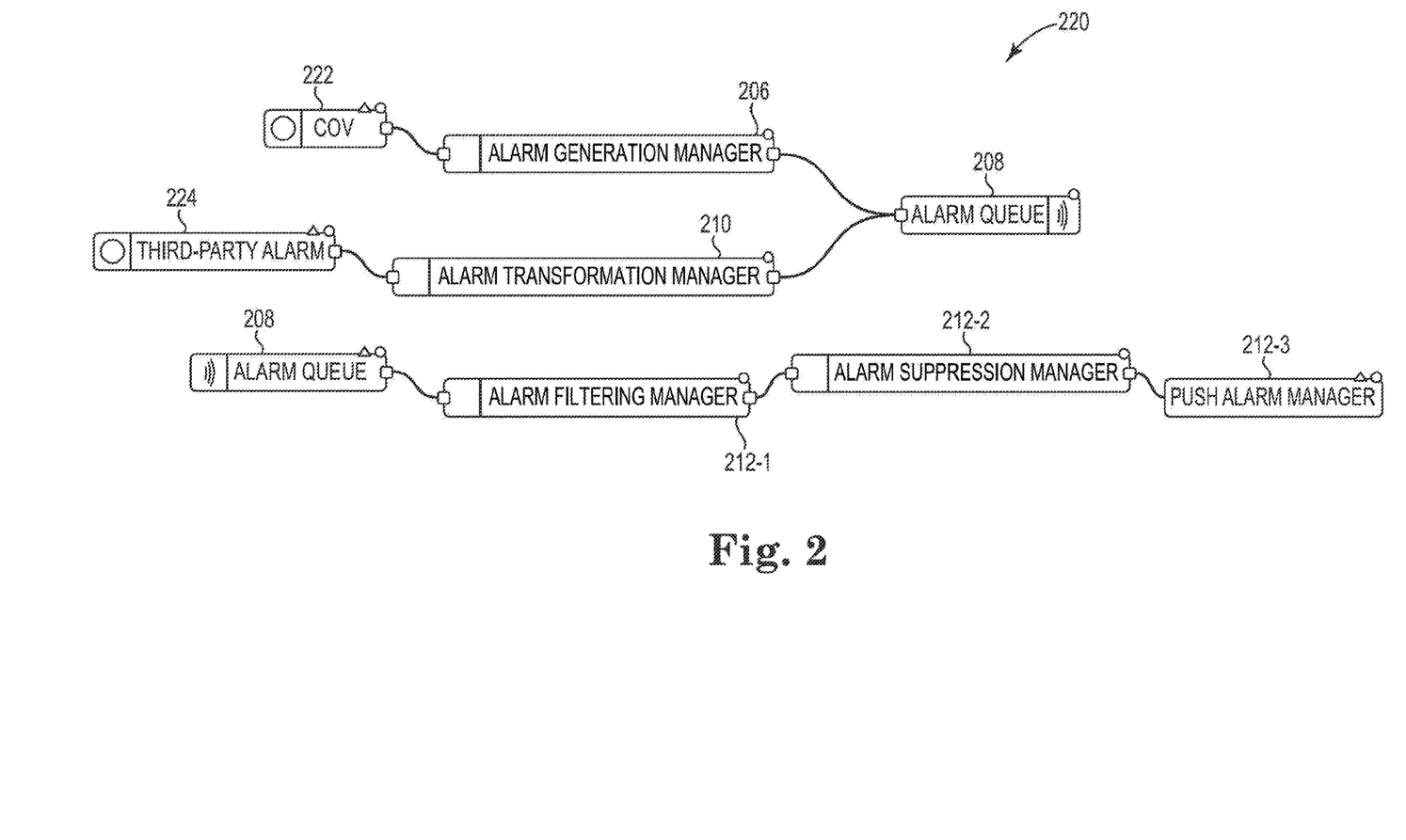
FIG. 2 is an example of a system for alarm processing according to one or more embodiments of the present disclosure.

FIG. 2 is an example of a system 220 for alarm processing according to one or more embodiments of the present disclosure. In some examples, the system 220 can be executed by a computing device. For example, the system 220 can be executed by a computing device 190 as referenced in FIG. 1 and/or by a computing device 490 as referenced in FIG. 4.

In some examples, the system 220 can utilize a change of value 222. For example, the system 220 can include an alarm generation manager 206 that can receive the change of value 222 from a sensor or monitor of a system. In some examples, the change of value 222 can be utilized by the alarm generation manager 206 to determine when an alarm is to be generated by the alarm generation manager 206. For example, the alarm generation manager 206 can generate an alarm when the change of value 222 is above a threshold or below a threshold value or change of value for a system. In some examples, the alarm generation manager 206 can generate a first type of alarm for a particular system and send the generated first type of alarm to an alarm queue 208.

In some examples, the system 220 can include a third party alarm generator 224. In some examples, the third party alarm generator 224 can be utilized to generate a second type of alarm. For example, the third party alarm generator 224 can generate a different type of alarm than the alarm generation manager 206. In some examples, the type of alarm can be an alarm generated by a particular sensor or alarm generator. In some examples, the different types of alarms can include a plurality of values that correspond to the alarm generated and the plurality of values can be in a corresponding format or layout. For example, the alarm generated by the alarm generation manager 206 can be in a first format and the alarm generated by the third party alarm generator 224 can be in a second format that is different than the first format.

In some examples, the system 220 can include an alarm transformation manager 210. The alarm transformation manager 210 can receive alarms generated by the third party alarm generator 224. As described herein, the alarms received by the third party alarm generator 224 can be a different type of alarm compared to alarms generated by the alarm generation manager 206. In some examples, the alarm transformation manager 210 can normalize the alarms received by the third party alarm generator 224. For example, the alarm transformation manager 210 can extract the values (e.g., monitored values) of the alarms received by the third party alarm generator 224 and generate alarms of the same type generated by the alarm generation manager 206 with the extracted values. In this example, the alarm transformation manager 210 can be utilized to normalize alarms from the third party alarm generator 224 before sending the normalized alarms to the alarm queue 208. As such, the system 220 can provide consistent alarms to the alarm queue 208 and utilize an alarm manager (e.g., alarm manager 112 as referenced in FIG. 1) to compare and/or filter the alarms within the alarm queue 208.

In some examples, the alarm queue 208 can be utilized to provide alarms generated by the alarm generation manager 206 and/or the alarm transformation manager 210 to a plurality of alarm managers 212-1, 212-2, 212-3. As described herein, the plurality of alarm managers 212-1, 212-2, 212-3 can be utilized to process the plurality of alarms from the alarm queue 208 prior to pushing the alarms to an application. In some examples, the alarms generated by the alarm generation manager 206 can be generated separately and at different times than the alarms generated by the alarm transformation manager 210. Thus, a first alarm and a second alarm can be generated in an asynchronous process. As used herein, an asynchronous process can include a process that occurs at different times and/or by different systems. For example, the change of values 222 can be generated by a first system at a first time and alarms generated by the third party alarm generator 224 can be generated by a second system at a second time.

In some examples, the system 200 can define parameters for the type of alarm generated for the alarm queue 208. For example, the system 200 can define a format for alarms sent to the alarm queue 208. In this example, the format can include a plurality of parameters that can be defined by the system 200. In some examples, the plurality of parameters can include monitored values, monitored change of values, categorization, sub-system that generated the alarm, among other parameters that can affect the format of the alarm.

In some examples, the plurality of alarm managers 212-1, 212-2, 212-3 can include an alarm filtering manager 212-1, an alarm suppression manager 212-2 and/or a push alarm manager 212-3 as illustrated in FIG. 2. The alarm filtering manager 212-1 can be utilized to compare the plurality of alarms from the alarm queue 208. In some examples, the alarm filtering manager 212-1 can be utilized to categorize the plurality of alarms from the alarm queue 208. For example, the alarm filtering manager 212-1 can monitor values associated with each of the plurality of alarms from the alarm queue 208 to determine a root cause for each of the plurality of alarms from the alarm queue 208. In some examples, the alarm filtering manager 212-1 can tag each of the plurality of alarms from the alarm queue 208 with a root cause and/or other categorization for the alarms.

In some examples, the alarm filtering manager 212-1 can transmit the filtered alarms from the alarm queue 208 to the alarm suppression manager 212-2. In some examples, the alarm suppression manager 212-2 can be utilized to compare the plurality of alarms received from the alarm filtering manager 212-1. For example, the alarm suppression manager 212-2 can compare the categorization and/or the root cause of the plurality of alarms received from the alarm filtering manager 212-1. In some examples, the alarm suppression manager 212-2 can be utilized to remove or delete alarms based on the categorization of the alarm and/or the root cause of the alarm. For example, the alarm suppression manager 212-2 can remove or delete alarms that have the same root cause. In this example, the alarm suppression manager 212-2 can delete duplicate alarms and/or alarms with the same root cause. This can prevent duplicate alarms from being pushed to an application or user as described herein.

The alarm suppression manager 212-2 can transmit or send alarms to the push alarm manager 212-3. In some examples, the alarm suppression manager 212-2 can transmit only alarms that have not been removed or deleted due to the categorization or root cause of the alarms. In some examples, the push alarm manager 212-3 can be utilized to send or push the alarms received from the suppression manager 212-2 to an application and/or to a plurality of users.

Figure 3:
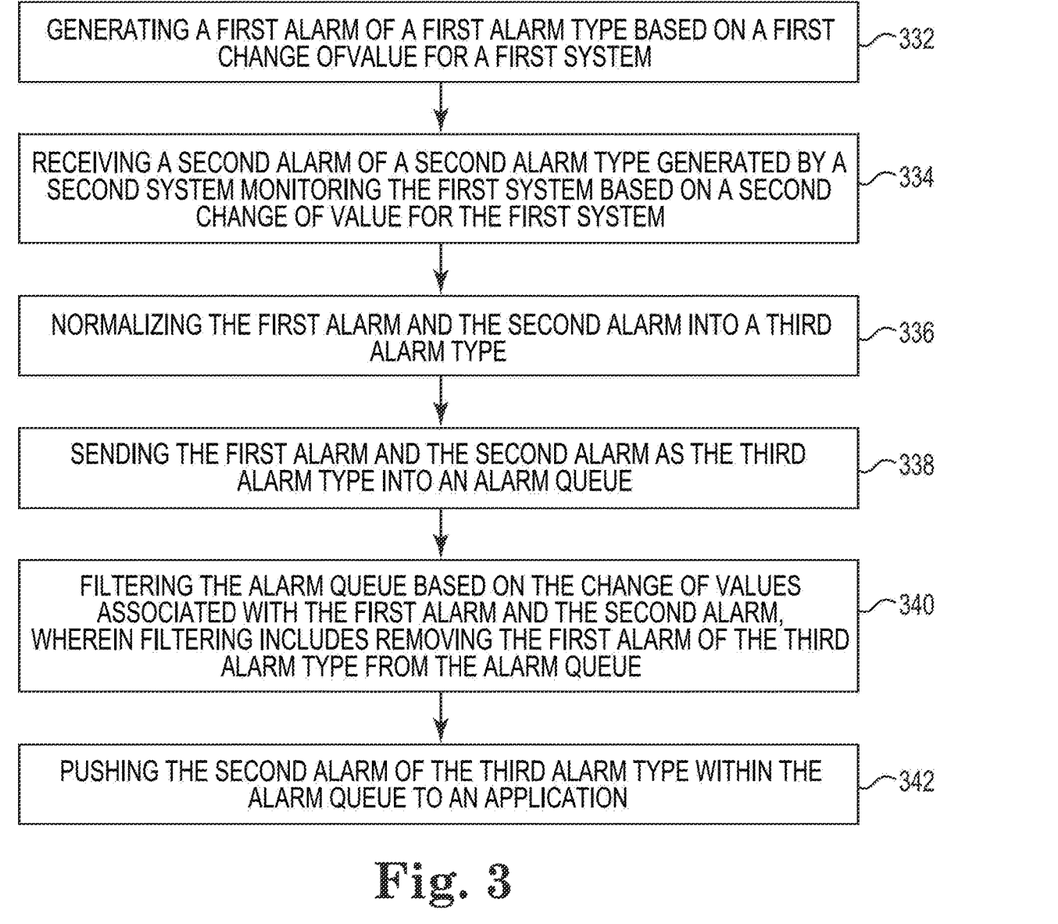
FIG. 3 is an example of a method for alarm processing according to one or more embodiments of the present disclosure.

FIG. 3 is an example of a method 330 for alarm processing according to one or more embodiments of the present disclosure. In some examples, the method 330 can be performed by a computing device. For example, the method 330 can be performed by a computing device 190 as referenced in FIG. 1 and/or by a computing device 490 as referenced in FIG. 4.

At block 332 the method 330 can include generating a first alarm of a first type of alarm based on a first change of value for a first system. As described herein, an alarm generation manager (e.g., alarm generation manager 106 as referenced in FIG. 1, etc.) can receive a monitored value and/or a monitored change of value from an HVAC system. In some examples, the alarm generation manager can generate alarms in a particular alarm format and/or in a particular type of alarm. In some examples, the alarm generation manager may not be configurable to alter the type of alarm generated by the alarm generation manager.

At block 334 the method 330 can include receiving a second alarm of a second type of alarm generated by a second system monitoring the first system based on a second change of value for the first system. In some examples, the second alarm can be generated by a third party alarm generator (e.g., third party alarm generator 224 as referenced in FIG. 2). In some examples, the second alarm can be a second type of alarm that is different than the first type of alarm. For example, the first type of alarm can be in a first format and the second type of alarm can be in a second format.

In some examples, the first alarm and the second alarm can include monitored values. For example, the monitored values that triggered the first alarm can be included within the first alarm and the monitored values that triggered the second alarm can be included within the second alarm. In some examples, the first alarm and the second alarm can include a description of a reason for generating the alarm. In some examples, the description can include the sub-system that generated the monitored values, the location of the sub-system that generated the monitored values, and/or a root cause of the alarm.

At block 336 the method 330 can include normalizing the first alarm and the second alarm into a third type of alarm. In some examples, normalizing the first alarm and the second alarm can include converting the first alarm and the second alarm into a third type of alarm. In some examples, normalizing the first alarm and the second alarm can include extracting values from the first alarm and the second alarm to generate a corresponding alarm with the extracted values as the third type of alarm. In some examples, a portion of the extracted values are not utilized when normalizing the second alarm into the third type of alarm. For example, the third type of alarm can be a format of an alarm that does not include particular the portion of the extracted values. In this example, the portion of the extracted values can be information that is not desired to be included within the alarms to be pushed to the application as described herein.

At block 338 the method 330 can include sending the first alarm and the second alarm as the third type of alarm into an alarm queue (e.g., queue 108 as referenced in FIG. 1). Sending the first alarm and the second alarm as the third type of alarm can include generating an alarm queue with the normalized alarms as described herein. Thus, the alarm queue can include a plurality of alarms that are in the same format and/or are the same type of alarm. In some examples, including the same type of alarm within the alarm queue can enable the plurality of alarms to be compared and/or filtered as described herein. In some examples, the first change of value can be monitored by a first sensor and the second change of value is monitored by a second sensor.

At block 340 the method 330 can include filtering the alarm queue based on the change of values associated with the first alarm and the second alarm, wherein filtering includes removing the first alarm of the third type of alarm from the alarm queue. In some examples, filtering the alarm queue can include categorizing each of the plurality of alarms within the alarm queue. In some examples, the categorization can be based on the change of values associated with the plurality of alarms. For example, the first alarm can be categorized based on a change of value that triggered the first alarm and the second alarm can be categorized based on a change of value that triggered the second alarm.

In some examples, the filtering can include categorizing the plurality of alarms based on a root cause of the plurality of alarms. For example, a root cause of a particular alarm can be determined based on the change of values associated with the particular alarm. In this example, alarms with the same root cause can be removed or deleted. Removing or deleting the alarms can include not sending the alarm to a push alarm manager (e.g., push alarm manger 212-3 as referenced in FIG. 2). As such, duplicate alarms can be removed such that duplicate alarms are not pushed to an application or user. Duplicate alarms can be confusing or distracting to a user. For example, a duplicate alarm can confuse a user whether there are multiple issues with a system or if there is a single issue with the system. Thus, the method 330 can include removing one of the first alarm and the second alarm upon determining they are duplicate alarms.

At block 342 the method 330 can include pushing the second alarm of the third type of alarm within the alarm queue to an application. As described herein, pushing the second alarm of the third type of alarm can include sending the second alarm to an application or user. In some examples, the first alarm can be removed as described herein when the first alarm is a duplicate alarm with the second alarm.

Figure 4:
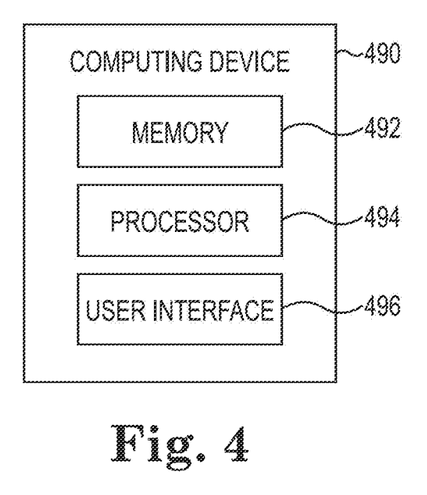
FIG. 4 is an example of a computing device for alarm processing according to one or more embodiments of the present disclosure.

FIG. 4 is an example of a computing device 490 for alarm processing according to one or more embodiments of the present disclosure. Computing device 490 can be, for example, a commodity server, a data center that comprises a plurality of servers, among other types of computing devices or embedded system. Computing device 490 can be utilized in system 100, method 220, and/or method 330 to perform the functions previously described herein. For example, computing device 490 can be utilized to perform alarm transformations by an alarm transformation manager 110, perform alarm generation by an alarm generation manager 106, provide management and monitoring by a management and monitoring engine 116, and/or provide alarm managers 112 as referenced in FIG. 1.

As shown in FIG. 4, computing device 490 includes a memory 492 and a processing resource 494 (e.g., processor) coupled to memory 492. Memory 492 can be any type of storage medium that can be accessed by processing resource 494 to perform various examples of the present disclosure. For example, memory 492 can be a non-transitory computer readable medium having computer readable instructions (e.g., computer program instructions) stored thereon that are executable by processing resource 494 to perform generating alarms and notifications in accordance with one or more embodiments of the present disclosure.

Memory 492 can be volatile or nonvolatile memory. Memory 492 can also be removable (e.g., portable) memory, or non-removable (e.g., internal) memory. For example, memory 492 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 492 is illustrated as being located in computing device 490, embodiments of the present disclosure are not so limited. For example, memory 492 can also be located internal to another computing resource (e.g., enabling computer readable instructions to be downloaded over the Internet or another wired or wireless connection).

As shown in FIG. 4, computing device 490 can also include a user interface 496. User interface 496 can include, for example, a display (e.g., a screen). The display can be, for instance, a touch-screen (e.g., the display can include touch-screen capabilities). User interface 496 (e.g., the display of user interface 496) can provide (e.g., display and/or present) information to a user of computing device 490.

Additionally, computing device 490 can receive information from the user of computing device 490 through an interaction with the user via user interface 496. For example, computing device 490 (e.g., the display of user interface 496) can receive input from the user via user interface 496. The user can enter the input into computing device 490 using, for instance, a mouse and/or keyboard associated with computing device 490, or by touching the display of user interface 496 in embodiments in which the display includes touch-screen capabilities (e.g., embodiments in which the display is a touch screen). In some examples, the user interface 496 can be utilized to display the plurality of alarms pushed by a different computing device (e.g., computing device 190 as illustrated in FIG. 1). In some examples, the alarms that are pushed to the computing device 490 can be displayed in the same or similar format.

As described herein, an "engine" can include computer readable instructions that can be executed by a processing resource to perform a particular function. An engine can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for alarm processing, comprising:
   a memory; and
   a processor configured to execute executable instructions stored in the memory to:
   generate, using an alarm generation manager, a first alarm of a Building Management System based on a first monitored value for the BMS, the first alarm has a first format;
   receive, at an alarm transformation manager, a second alarm of the BMS based on a second monitored value for the BMS, the second alarm has a second format that is different from the first format;
   transform, using the alarm transformation manager, the second alarm into a modified second alarm, the modified second alarm has the first format;
   send the first alarm and the modified second alarm to an alarm queue;

filter the alarm queue based on the monitored values associated with the first alarm and the modified second alarm within the alarm queue; and push the first alarm or the second alarm within the alarm queue to an application based on the filtering.

2. The computing device of claim 1, wherein the processor is configured to execute the instructions to compare the alarms within the alarm queue to filter the alarm queue.

3. The computing device of claim 2, wherein the processor is configured to execute the instructions to determine whether the first alarm and the modified second alarm are duplicate alarms based on the comparison.

4. The computing device of claim 3, wherein the processor is configured to execute the instructions to remove one of the first alarm and the modified second alarm upon determining they are duplicate alarms.

5. The computing device of claim 1, wherein the first alarm and the second alarm are generated in an asynchronous process.

6. The computing device of claim 1, wherein the processor is configured to transform the second alarm into the modified second alarm by extracting values from the second alarm and generating the modified second alarm utilizing the extracted values.

7. A non-transitory computer readable medium, comprising instructions that when executed by a processing resource cause the processing resource to:

generate a first type of alarm for a first system based on a monitored value for the first system;

receive a second type of alarm generated by a second system based on a monitored value for the first system;

normalize each of the first type of alarm and the second type of alarm into a third type of alarm;

send a plurality of alarms of the third type to an alarm queue;

filter the alarm queue based on monitored values associated with the plurality of alarms; and push a portion of the plurality of alarms within the alarm queue to an application based on the filtering.

8. The non-transitory computer readable medium of claim 7, wherein the instructions are executable by the processing resource to normalize the second type of alarm into the third type of alarm by extracting values from the second type of alarm and generating the third type of alarm utilizing the extracted values.

9. The non-transitory computer readable medium of claim 7, wherein the instructions are executable by the processing resource to define parameters for the third type of alarm.

10. The non-transitory computer readable medium of claim 9, wherein the defined parameters include a format for the third type of alarm.

11. The non-transitory computer readable medium of claim 7, wherein the instructions are executable by the processing resource to determine a root cause of one or more of the alarms of the first type of alarm and a root cause of one or more of the alarms of the second type of alarm.

12. The non-transitory computer readable medium of claim 11, wherein the instructions are executable by the processing resource to remove one or more of the alarms of the first type of alarm from the alarm queue when the root cause of the one or more of the alarms of the first type of alarm is the same as the root cause of the one or more alarms of the second type of alarm.

13. The non-transitory computer readable medium of claim 11, wherein the root cause includes a location and a subsystem that corresponds to the alarm.

14. A method for alarm processing, comprising:

generating a first alarm of a first type of alarm based on a first change of value for a first system;

receiving a second alarm of a second type of alarm generated by a second system monitoring the first system based on a second change of value for the first system;

normalizing the first alarm and/or the second alarm;

sending the first alarm and the second alarm into an alarm queue;

removing one or more duplicate alarms of the first alarm type and/or the second alarm type from the alarm queue when one or more duplicate alarms are detected; and pushing one or more of the alarms within the alarm queue to an application.

15. The method of claim 14, wherein the one or more duplicate alarms relate to a common root cause.

16. The method of claim 14, wherein normalizing the first alarm and/or the second alarm includes extracting values from the first alarm and/or the second alarm to generate a corresponding alarm with the extracted values as a third type of alarm.

17. The method of claim 16, wherein a portion of the extracted values are not utilized when normalizing the first alarm and/or the second alarm second alarm into the third type of alarm.

* * * * *